(12) United States Patent
Humphrey

(10) Patent No.: US 8,376,239 B1
(45) Date of Patent: Feb. 19, 2013

(54) METHOD OF USE OF A SIMULATED MAGNETIC STRIPE CARD SYSTEM FOR USE WITH MAGNETIC STRIPE CARD READING TERMINALS

(76) Inventor: Thomas David Humphrey, Sacramento, CA (US)

( * ) Notice: Subject to any disclaimer, the term of this patent is extended or adjusted under 35 U.S.C. 154(b) by 46 days.

(21) Appl. No.: 13/135,579

(22) Filed: Jul. 8, 2011

(51) Int. Cl.
*G06K 19/06* (2006.01)
(52) U.S. Cl. .................................................. 235/493
(58) Field of Classification Search ............... 235/379, 235/380, 383, 449, 493
See application file for complete search history.

(56) References Cited

U.S. PATENT DOCUMENTS

| | | | |
|---|---|---|---|
| 5,955,961 A * | 9/1999 | Wallerstein | 340/5.4 |
| 6,764,005 B2 * | 7/2004 | Cooper | 235/449 |
| 6,769,607 B1 * | 8/2004 | Pitroda et al. | 235/380 |
| 7,558,110 B2 * | 7/2009 | Mizushima et al. | 365/185.04 |
| 8,313,037 B1 * | 11/2012 | Humphrey | 235/493 |

* cited by examiner

*Primary Examiner* — Seung Lee
(74) *Attorney, Agent, or Firm* — Michael J. Tavella

(57) ABSTRACT

A method of read magnetic stripe card(s) into a database, to select a specific card from the database, and to output the data related to that specific card to existing merchant card reader equipment with no modification. A simulated magnetic stripe card can be tethered to a cell phone via the headset jacks. A more complex design uses an un-tethered, simulated magnetic stripe card by including BLUETOOTH (or other wireless) communications on the card. This dual purpose invention is intended to eliminate the need to carry multiple magnetic stripe cards in a wallet or purse by consolidating all of the individual card information into a form to be reproduced onto the simulation card when needed by the user. It can also be used at a merchant POS card reader to allow an existing MSD reader to be converted to use in wireless cell phone transactions e.g. BLUETOOTH or NFC.

15 Claims, 11 Drawing Sheets

METHOD OF USE OF A SIMULATED MAGNETIC STRIPE CARD SYSTEM FOR USE WITH MAGNETIC STRIPE CARD READING TERMINALS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to magnetic stripe cards and particularly to magnetic stripe cards that can be loaded with a data file.

2. Description of the Prior Art

There are approximately 75,000,000 magnetic card readers existing in the US at merchant stores and other locations that utilize magnetic stripe cards for their transactions. These readers are normally used to swipe the cards to read the information stored on magnetic strips on the cards. These cards are divided into several groups. There are basic credit cards, airline mileage cards, retail store loyalty cards, gas station cards, and many others. As a result, many people carry several of these cards with them at all times. Not only does this require a large wallet, it also causes a security problem. If the wallet is lost or stolen, all of the cards have to be canceled, which can be a huge job.

Technology is also attempting to change how these transactions are done. Current applications of cell phones and so-called "smart phones" are proposed using optical "bar code" type transmission or (radio frequency identification (RFID) or near field communications (NFC) type transmission, so-called "tap n go" payment schemes. For example, bar code type presentations are currently used on cell phones for airline boarding passes. Support for NFC is now currently available using popular operating systems. However, there are problems with these systems in that they usually require merchants and other businesses to change their equipment from the standard card readers to new machines capable of operating in an RFID or NFC environment. Many such businesses do not see any advantage to making a change. Moreover, users have been reluctant to move to RFID or NFC based on fears of improper reads resulting in unwanted purchases by mistake. Finally, although the use of so-called smart phones is growing, there are still many people who do not use them. Therefore, the idea of switching to a system now that is not used by the majority of the population is a problem.

There currently is no way to use your cell phone to transact business using legacy magnetic stripe card readers, without modification to the reader. Some attempts have been tried to adopt the new cell phones to card reader technology. Some attempts at solving this problem are found in the following publications. U.S. Published Application US2010/0265037 teaches a dynamic transaction card. This card uses coils to impost a magnetic field onto "strips" than can be read by a card reader. The data are installed into a memory on the card for later use. Two major problems with this card are that first, the data must be read onto the card using a special writer. Obviously, a typical consumer would not have access to such a device and even if they did, it would most likely be costly. Moreover, apparently, the card can store data for one card at a time. Thus, the user is limited either to using only one type of card at a time, or loading the single card's information onto the smart card and then carrying the rest. That, of course, eliminates any benefit of the invention. The second problem is the need for a special playback circuit that requires a precision that is difficult to accomplish in actual field use. This card was designed primarily to provide a new method of security for transactions by utilizing a "dynamic" time computation which changes the account number at each transaction.

U.S. Pat. No. 7,828,214 teaches a system that uses a cell phone or similar device to download data to a memory card. Although a major improvement over the former device, it too has limitations. First, many cell phones in use today do not have memory card slots on them. Second, for use with what the patent calls "swallow" type machines (ATMs, gas pumps, etc), a special adaptor is needed. This means that a user must have the adaptor and know how to use it, which adds hardware and makes the use of the device more difficult. Moreover, the embodiments, here the card is attached to the phone may be difficult to use because of the size of the card readers. Finally, with the exception of one embodiment that had printing on the card, there is no way for a shop clerk to verify what type of card it is, what the expiration date is or any of the usual data associated with credit and other type cards. While the card reader may indeed be able to read the data, the clerk at the retail establishment will not.

U.S. Pat. No. 6,378,774 teaches a smart card that is modular. Although it appears to be versatile, it too lacks the ability of providing visual identification for a clerk or other retail worker to verify anything about the card. U.S. Pat. No. 4,605,844 teaches as yet another smart card that once again is not designed to provide information to a clerk. This card is specifically intended to use as a phone credit card, where it would not be necessary to verify the owner of the card. Note that this card shows a name and an ID number apparently printed on a protective layer on the card. This of course would limit the card to that one ID number and apparently does not include any way to vary the type of card identification. Thus, one occasion the card can be a phone card and on another a credit card, with no way to show just what card it is supposed to represent.

In all of the prior art, there are numerous attempts at providing smart cards that help consumers. However, none of them have a simple, effective method and system that allows a user to carry one smart card and a display means so that the card can be used in multiple locations in multiple ways in the field without having to carry cumbersome equipment to reformat the card and to have a means for displaying the visual information associated with the card that is being used at any particular time.

BRIEF DESCRIPTION OF THE INVENTION

The instant invention overcomes these problems. It is a method that uses a standard magnetic reading head to collect a signal previously stored on a magnetic stripe card. The signal contains data for a particular type of transaction card as selected by the user. This invention is unique in that it does not interpret the signal to determine the account number but only stores the signal waveform with standard A/D audio recording methods as can be done through the microphone (mic) jack of a cell phone and some simple algorithms to verify and cleanup the recorded signal for reliable playback. The signal can be transmitted to the card without storage on the card, or can be stored for an adjustable period on the card, depending on the configuration of the card. In an alternate embodiment the signal could also be produced directly from ASCII data.

This invention enables users to have a cell phone and a simulated magnetic stripe card to be seamlessly used on all types of transactions in place of multiple conventional magnetic stripe cards.

To accomplish this, the system uses two key facets of this technology. Currently, cell phones are capable of storing the information from every card in your wallet and presenting it back on demand, this includes the contents of the magnetic strip (e.g., account numbers and expiration dates), as well as actual photographs of the front and back of any particular card.

Of course, a cell phone cannot be passed through a magnetic card reader transmitting the information on the magnetic stripes. Nor do cell phones readily record data from magnetic stripes. However, both of these requirements are resolved by this invention. A method for receiving information from a magnetic stripe card into a cell phone is described. A method for transmitting magnetic stripe card information to a typical merchant POS card reader or ATM using either a tethered (wired) or un-tethered (wireless) simulation card is described.

With this invention a user can store the information from every card in a wallet, consolidating them all to a cell phone.

A further benefit of this invention is it is the perfect mechanism to be used to transition people from credit card transactions to cell phone transactions by maintaining full compatibility with existing magnetic card reader equipment while at the same time conditioning people to use the cell phone and getting rid of the necessity to carry many credit cards around in a bulky wallet. This also enables both people without cell phones and merchants with no desire to change, to continue to use legacy methods into the future.

The simulation card can be carried attached to the cell phone in a case no larger then current protective case. Data is ultimately backed up and stored by retaining the original physical cards in a safe place where they can be retrieved and re-entered.

All of the security features enabled by a cell phone can be used with this invention. Most obvious being use of a PIN number to enable the application to be run. The card does not permanently store the data. Thus, if the simulation card is lost or stolen it cannot be used at all since it must communicate via tether or with nearby BLUETOOTH (or NFC) communication with only its host cell phone.

It is an object of this invention to provide a method of reading, storing, and retransmitting magnetic card stripe data without intermediate steps of interpreting the data being represented It is yes another object of the invention to provide a method of reading, storing, and retransmitting magnetic card stripe data that allows ASCII data to be entered and processed into a usable waveform as an option.

It is another object of this invention to provide a method of reading, storing, and retransmitting magnetic card stripe data that saves and uses an analog waveform as a means of reproducing the data onto a card.

It is yet another object of this invention to provide a method of reading, storing, and retransmitting magnetic card stripe data that has the ability to determine when the magnetic strip of the simulation card is in contact with the reader head to initiate playback of the signal.

It is yet another object of this invention to provide a method of reading, storing, and retransmitting magnetic card stripe data that detects the change in inductance created by close proximity and contact of the reader's head to the magnetic core strips on the card to send the signal.

It is yet another object of this invention to provide a method for which the determination of when to transmit the data is accomplished by a variety of methods such as: a simple pressure switch, or an inductance methods.

It is yet another object of this invention to provide a method that uses an application in a cell phone that utilizes existing cell phone technology such as that used in headsets to play and fast forward to obtain and playback data.

It is yet another object of this invention to provide a method that uses a change in resistance detectable by the cell phone circuitry to a play signal from the cell phone.

It is a further object of this invention to provide a method of reading, storing, and retransmitting magnetic card stripe data that uses an alternate method to play back the signal multiple times during a single card reading.

It is yet another object of this invention to provide a method of reading, storing, and retransmitting magnetic card stripe data that enables a credit card issuer or other magnetic stripe issuer to have cardless distributions, such as where card information could be sent to the user via email in a file and then used just as if it was acquired from an actual card.

It is yet a further object of the invention to provide a method in which a PIN number is needed to enable the application to be run.

It is yet a further object of the invention, in its consumer embodiment, to provide a method in which if the simulation card is lost or stolen it cannot be used to make charges against the owner's account since it must communicate via tether or with nearby BLUETOOTH communication with the owner's host cell phone.

It is a further object of the invention in that the invention provides a POS embodiment that is retained at the merchant's card reader and has the ability to communicate with any smart cell phone running the application, such that a single card issuer may have a dedicated application on the cell phone that allows each enrolled cell phone user to transact via Bluetooth or other wireless method with a simulator card placed stationary in a card reader.

It is a further object of the invention to provide a method in which the simulation card does not store the data for an extended time.

It is further object of one aspect of the invention to provide a method in which a stereo output of a cell phone enables a tethered simulation card to receive data on two tracks by transmitting the signal of both tracks with the two channels of stereo. Said method could transmit the data during separate time windows to avoid crosstalk between magnetic cores. Said method could also use a multiplexing and demultiplexing arrangement to further allow multiple signal tracks to be sent via one or more channels.

Finally, is yet a further object of another aspect of the invention to provide a method in which a switch on the cell phone is used to trigger the start of the use of the card, after which the cell phone continues to resend the signal a predetermined number of times and durations.

DETAILED DESCRIPTION OF THE INVENTION

In the consumer embodiment of the invention, a method is used to organize dozens of magnetic cards typically found in wallets and purses. Once the data from all of the cards is collected and stored, the need to carry all of the cards is eliminated. Instead, only one card (a simulation card), together with a cell phone with the data transmit application, takes the place of all these cards. This method allows the use of standard magnetic stripe card readers, found in millions of mercantile locations to read the simulation card.

A second embodiment of the invention is a method that allows a transaction application running on a standard BLUETOOTH or other wireless enabled smart cell phone to communicate with the simulator magnetic stripe card which is located in the merchants POS magnetic card reader and complete a transaction as if an actual physical magnetic stripe card were used.

To accomplish this, the method uses an amplifier, an analog to digital (A/D) converter and signal processor, and storage as found in a current standard modern smart cell phone device having microphone, headset, and sound record and play features.

Now, current magnetic cards have a magnetic strip that is divided into three tracks. The use of these tracks is based on international conventions and is considered "universal". Track 1 uses a format established by the Air Transport Association and normally stores a name. Track 2 was defined by the banking industry and typically stores an account number (e.g., a credit card number). Track 3 was originally intended for use with Automatic Teller Machines; however for a number of reasons, the use of this track has never caught on. As a result, only tracks 1 and 2 are used generally in commerce. The reading of these data tracks is done using a standard convention known as "F2F" or the "Aiken Biphase" encoding. This technology is well established in the art and is described here solely to illustrate what the instant invention is designed to mimic.

Figure 1:
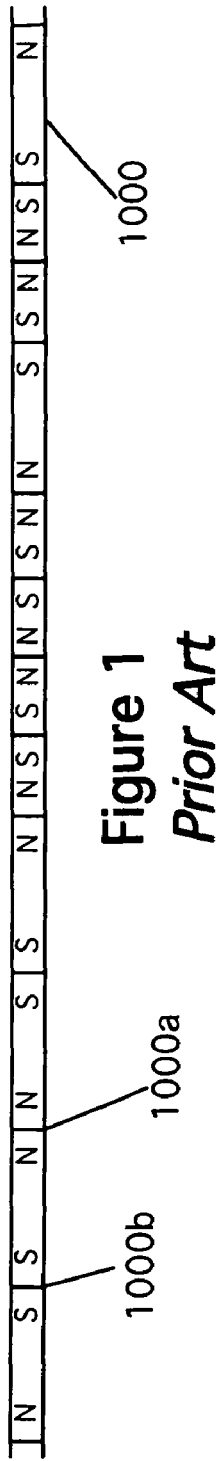
FIG. 1 is a diagrammatic view of a typical magnetic card strip showing the placement of magnetic poles on the card, as prior art.

FIG. 1 shows that each magnetic track 1000 is encoded with a number of magnetic poles north 1000a and south 1000b. The arrangement of these poles corresponds to a data set that is used to produce a set that includes all numbers, letters and special symbols for business transactions. The specific set of symbols is not important here, only that each card has a set of magnetic poles that when read correspond to the set of symbols.

Figure 2:
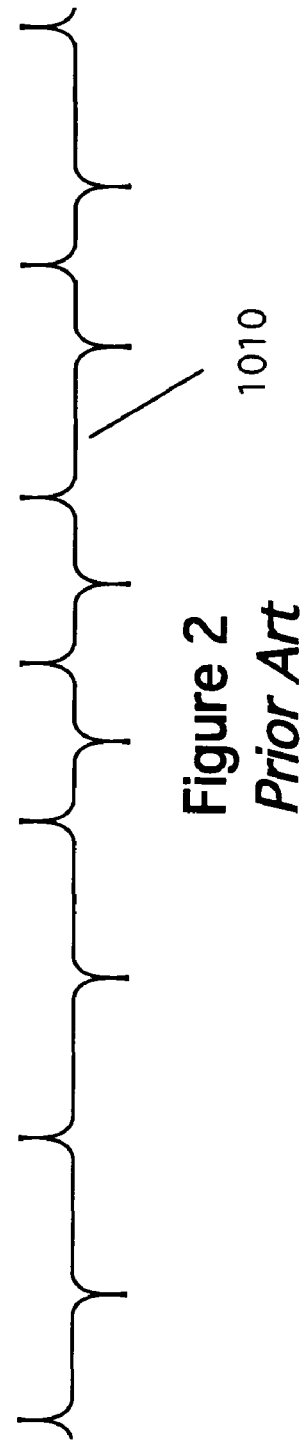
FIG. 2 is a diagrammatic view of a set of pulses produced in a magnetic card reader when a card is swiped, as prior art.

Now, when a card is swiped in a reader, a string of magnetic pulses 1010 are produced. See FIG. 2. These pulses are either positive or negative depending on the pole seen by the reader. These pulses are then converted to a square wave electrical signal using the Aiken Biphase system (F2F). These square waves are then interpreted by the software into a set of Binary Card Data that are then applied to the translation tables to produce the Magnetic Stripe Data (MSD) stored on the card.

Figure 3:
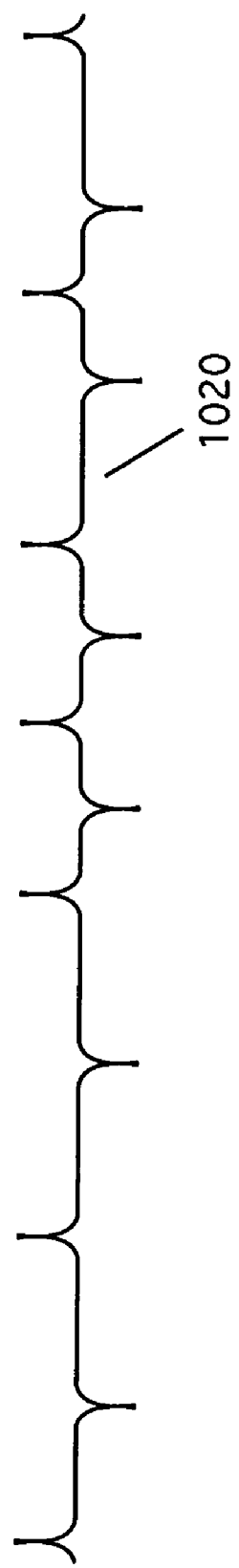
FIG. 3 is a diagrammatic view of a set of pulses produced that are recorded and stored in a cell phone as part of the invention.
Figure 3A:
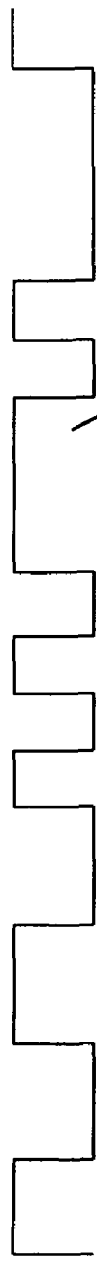
FIG. 3A is a diagrammatic view of the same set of pulses converted to its F2F representation and their binary equivalence.
Figure 3B:
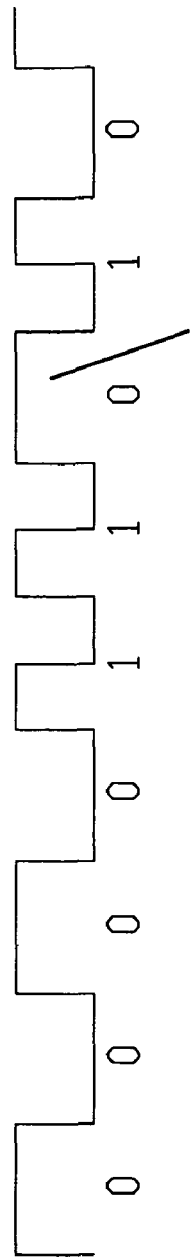
FIG. 3B is a diagrammatic view of the F2F waveform in FIG. 3A conformed so that all of the pulses widths have a uniform time period and also shows frequency translation to effectuate a faster more reliable waveform for retransmission with the simulated magnetic stripe card.
Figure 3C:
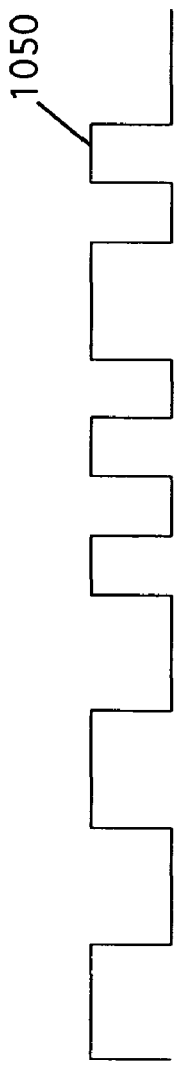
FIG. 3C is a diagrammatic view of the conformed waveform of FIG. 3B speed up by about 10% to allow faster playback.

FIG. 3 shows that in the instant invention, the card is read and the magnetic pulses 1020 are recorded. The waveform may be played back, as is, in a simple embodiment of the invention. However, to optimize storage space and reliability of operation, in the preferred embodiment, the waveform is processed by conversion into F2F as in FIG. 3A. The waveform is further processed by removal of extraneous leading and trailing noise, normalization of the period of each cycle as in FIG. 3B, and adjustment of the speed as in FIG. 3C, to achieve optimum playback. The signal is then stored. When a person uses the simulated magnetic stripe card the system plays back the signal 1050 as a "wav" file using the D/A of the cell phone. Thus, when played back. The signal appears to the magnetic card reader as a number of magnetic pulses corresponding to the magnetic poles on a typical card (step one of the normal read process). The legacy magnetic card reader must then convert this signal from the simulation card, using its normal process, as discussed above. In essence, this invention allows a user to store the existing MSD (magnetic stripe data) found on their existing cards onto an application in a cell phone and then using the simulation card, to replay the MSD (as a set of pulses corresponding to the original magnetic poles) in the legacy magnetic card reader as if it is the original card.

The method uses a standard magnetic stripe reading head to collect a data signal from a card. The signal is then transmitted into the cell phone application via the standard mic input on the cell phone. (Or it can be recorded off line and transmitted via email or other methods).

Most common cards only utilize track 2. However, the fact that a cell phone is designed for stereo headset operation enables even the tethered version of this invention to be able to simulate cards, which use two tracks by transmitting the signal of both tracks with the two channels of stereo and using a simulated magnetic stripe card with two coils and cores.

There is a need for a trigger mechanism to indicate when the card is properly in the reader and the signal should be sent. This invention describes three methods; one that uses detection of the read head on the magnetic core strips change in inductance as a method to detect when the signal should be sent; a second that uses a force sensing resistor to detect when the pressure of the read head contacts the beginning of the swipe of the card; and a third that, in lieu of a signal trigger, uses a switch on the cell phone to trigger the start of the use of the card and then resend the signal a predetermined number of times and durations (similar to a clerk re-swiping a card over and over trying to get a good reading). Within a typical time frame once the card reader recognizes a good swipe it will ignore additional swiping.

Figure 4:
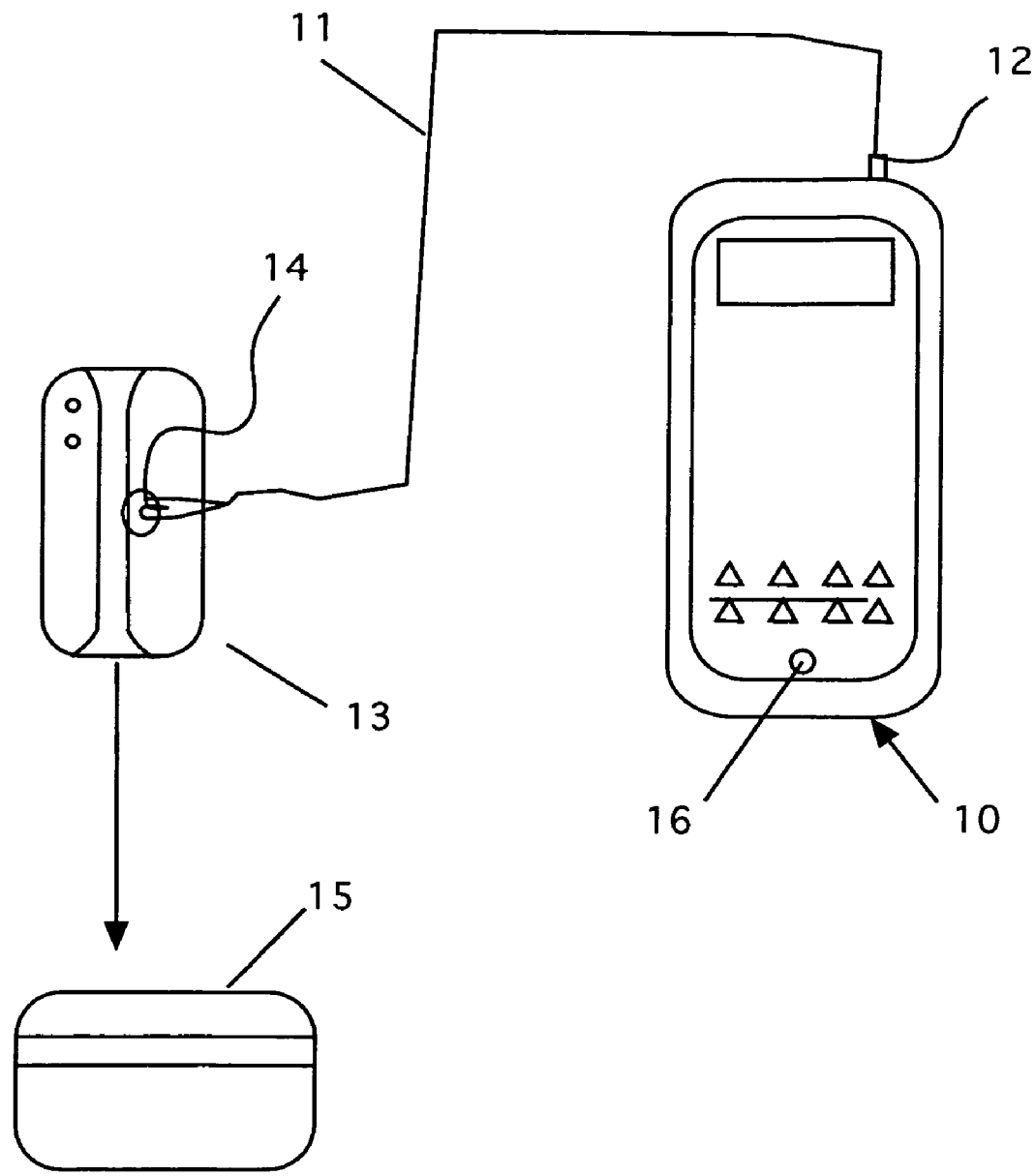
FIG. 4 is a diagrammatic view of a configuration used to input data to a cell phone application during the initial setup of the system.

FIG. 4 is a diagrammatic view of a configuration used to input data to a cell phone application during the initial setup of the system. This is the simplest embodiment and puts all of the control functions and data storage in a cell phone while a simulation card only has magnetic cores and one or more energizing coils that are connected to the cell phone via the cell phones headset jack or can be connected via a wireless system such as BLUETOOTH, for example. In FIG. 4, each card is read for data and is then stored in the cell phone. The figure shows a cell phone 10 that has a connection lead 11 that attaches to the microphone (MIC) jack 12. The other end of the lead 11 connects to a magnetic card reader 13 that has a read head 14. The user selects which cards the user wants to store in the cell phone. For each card 15, the user runs the card through the magnetic card reader 13 to read the data from the card. The cell phone has an application stored on it that reads the output from the magnetic card reader 13 and stores it for later use. The user also uses the camera 16 on the phone 10 to photograph the front and back of the card. The application then matches these photos up with the data for the card and stores it. When the user is ready to use the card, the on-board application provides a list of stored cards. Once a card is selected, it is displayed on the cell phone and the data is ready to be sent to the simulation card. There are two methods for doing that, which are discussed below.

Figure 5:
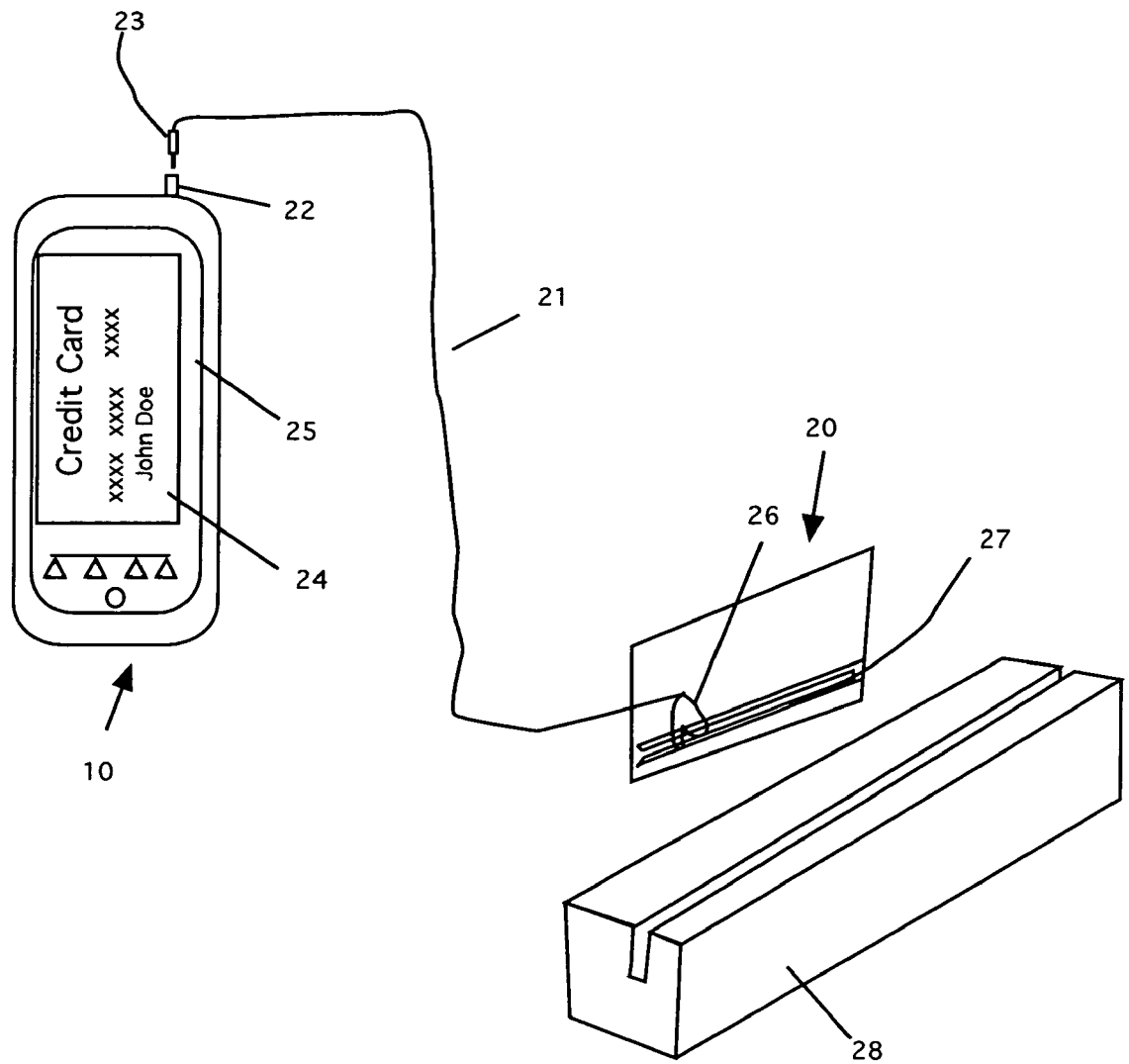
FIG. 5 is a diagrammatic view is the system showing data being transmitted to the card using a tether to be read during a transaction in a conventional card reader.

FIG. 5 is a diagrammatic view is the system showing data being transmitted to the card using a tether to be read during a transaction in a conventional card reader. This is the first method and, although is the simplest method, it is not preferred. To use the system, the cell phone 10 is connected to a simulation card 20 by a tether 21. The tether 21 attaches to the headphone jack 22 of the cell phone 10 by a connection jack 23. Note that the cell phone 10 displays the face of the selected card 24 on the screen 25 of the cell phone 10. When the user is ready to swipe the card. Note, the term "swiping" throughout this application includes actually pulling the card through a reader, placing the card in the reader briefly, or allowing it to be swallowed and read by motorized readers. This invention does not require that the card be pulled through the reader to transmit the data. Being in contact with the read head during the transmit period even if stationary is sufficient. In fact it is the preferred, e.g. for the wireless POS embodiment the card rests stationary in the reader. The application is alerted and a signal (discussed below) is sent to the simulation card 20. This signal is in the form of an analog file (such as a waveform audio file format (.wav) file that contains the data for the card. There are at least two methods that can be used to initiate the sending of the file. In the tethered system, it is not as critical because the tether is continuously connected, however, in the wireless system, the timing of use is more critical, as discussed below. One method of initiating the signal can be with a button on the cell phone that is part of the application. Another method is where contact with the read head of the magnetic card reader 28 is made. In either case, when data flow is initiated, the signal is transmitted through the tether 21 to a coil 26 on the simulation card. This coil then induces a magnetic flux onto the magnetic strips 27 on the simulation card 20. The magnetic card reader 28 then reads this data as it would any magnetic card and the transaction is processed as before. Although this system is simple, it has a few limitations. Because the card is tethered to a phone, a clerk cannot take the card to a remote magnetic card reader to process the card. Moreover, this device may not work successfully in magnetic card readers that are the swallow type, commonly found on ATM machines.

Figure 6:
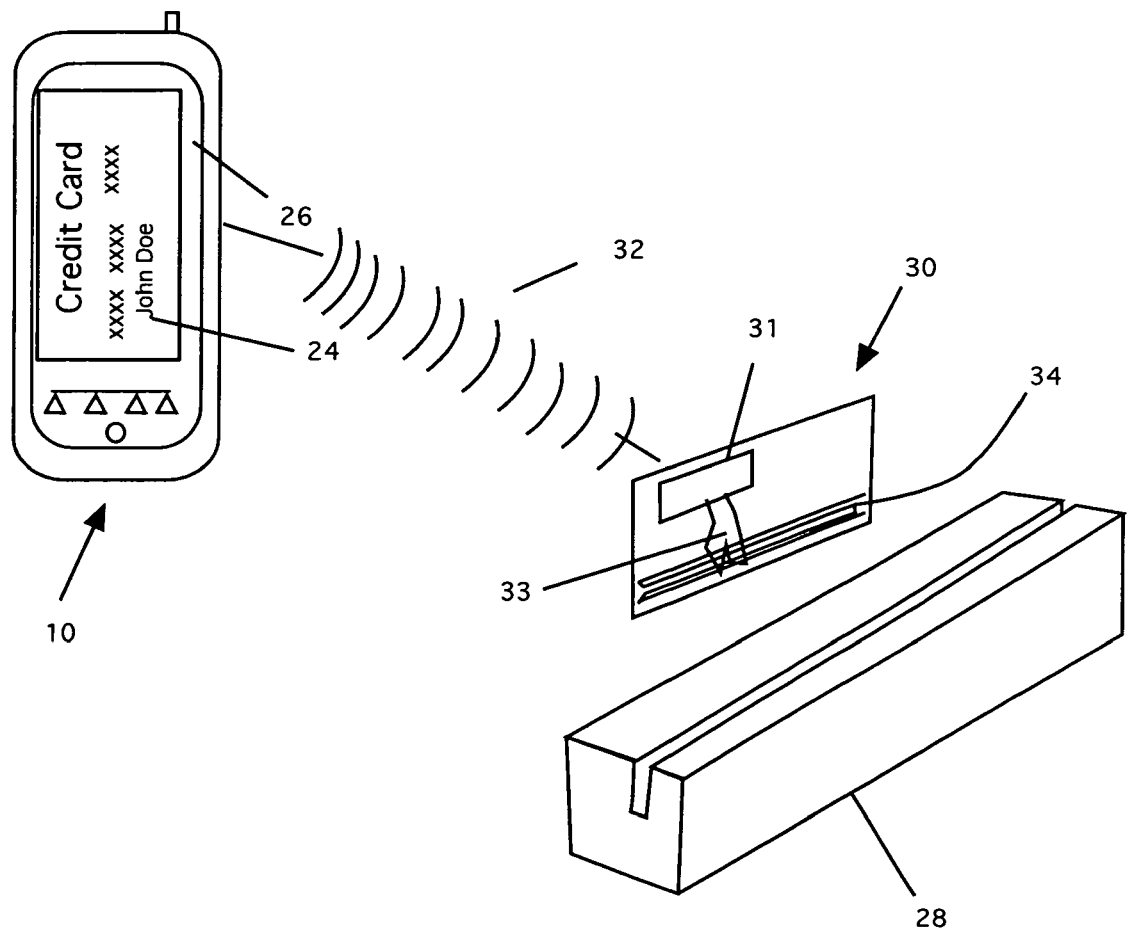
FIG. 6 is a diagrammatic view of the system showing data being transmitted to the card using an un-tethered (wireless) environment to be read during a transaction in a conventional card reader.

To solve these problems, a wireless system has been developed. FIG. 6 is a diagrammatic view of the system showing data being transmitted to the card using an un-tethered (wireless) environment to be read during a transaction in a conventional card reader. In this embodiment, the cell phone 10 is shown displaying the face of the selected card 24 on the screen 25 of the cell phone 10 as before. In this embodiment, the simulation card 30 has a receiver module 31 that receives the signal wirelessly (shown as a jagged line 32) from the cell phone. In the preferred embodiment, the signal is transmitted using a common protocol such as BLUETOOTH because it is a standard feature of current cell phones. Of course, any other wireless protocol could be used, with the proper equipment modifications. The receiver 31 then sends the signal through a coil 33 that creates a field that imparts the signal to the magnetic strips 34 on the card. The card is then placed in the reader as before. Just like the tethered version, which can transmit the signal many times during the process, the wireless system can send the signal to the card as many times as the trigger method requires. However, in an alternate embodiment the card can store the signal and then retransmit independent of the cell phone for a limited amount of time or cycles as determined by the application and ultimately limited by the battery life on the card. In this way, the card can be read in the reader 28, but the card becomes useless after a period of time, as the data on it is gone. For instances where longer times are needed, such as when a clerk or waitperson must take the card to a remote location, or for use on an airplane where any cell phone transmission is not allowed a modified simulation card is used, that provides power for additional storage time.

It is also possible to design a system that uses wireless technology (BLUETOOTH, NFC, or similar). This embodiment is discussed below.

Figure 7:
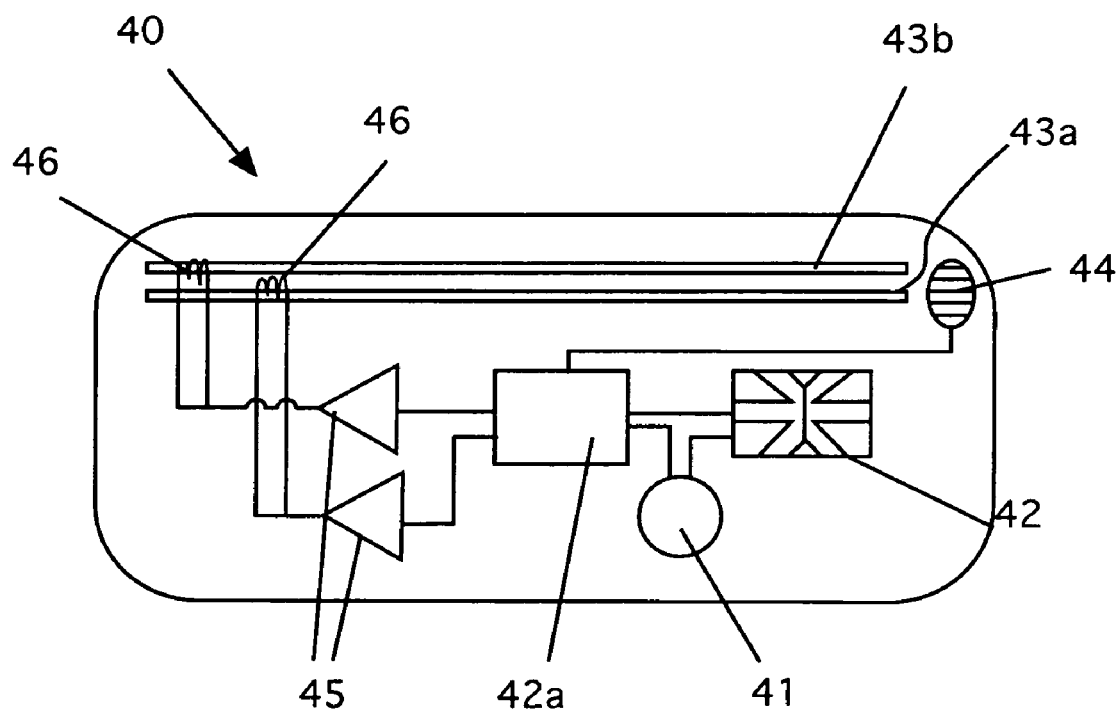
FIG. 7 is a diagrammatic view of a simulated magnetic stripe card with on-card storage and computation features used in this system with wireless receiving capability.

FIG. 7 is a diagrammatic view of a simulated magnetic stripe card 40 with on-card storage and computation features used in this method with wireless receiving capability. This card shows details of the circuitry installed on the wireless type card. There is a small battery 41 or power source. This battery is sized to maintain the signal on the card for a limited period of time. There is a serial interface 42, which is either a contact type, wireless (BLUETOOTH, RFID or other NFC) type device. A microprocessor 42a is used to store the current card data that has been downloaded to the card. It also handles the interface with the application in the cell phone. Finally, it detects the magnetic card reader and controls the sending of the signal. In the embodiment shown, two magnetic tracks are shown. As discussed below, these tracks can be coils and cores of different configurations. Also indicated in this diagram is a force sensing resistor 44 which is used as a switch to indicate when a swipe is initiated to enable the waveform to be transmitted at the correct time. To transmit the signal, digital to analog (D/A) converters 45 are used to send the signals through coils 46 that induce the signal into strips 43 as shown. In this way, the user swipes the simulated card that has the proper signal installed, the point-of-sale (POS) magnetic card reader sees it as a standard magnetic card. It then sends the data for processing exactly like any other card. The battery allows the signal to be stored for a brief time to allow a clerk (or waitperson) to take the card to a remote location for processing.

Note that anytime during the transaction, the user can show the original card face and back to the clerk using the photos on the cell phone. In this way, the POS person is assured that the user has a proper card.

Figure 8A:
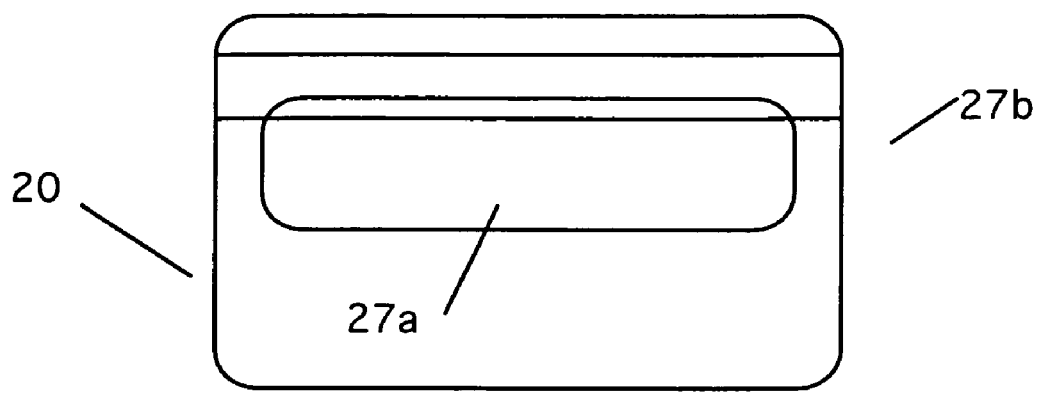
FIGS. 8a-8c are diagrammatic views of different configurations of cores formed on the card that allow the coil to be located in a less dense area of the card and to contain the magnetic flux more efficiently.
Figure 8B:
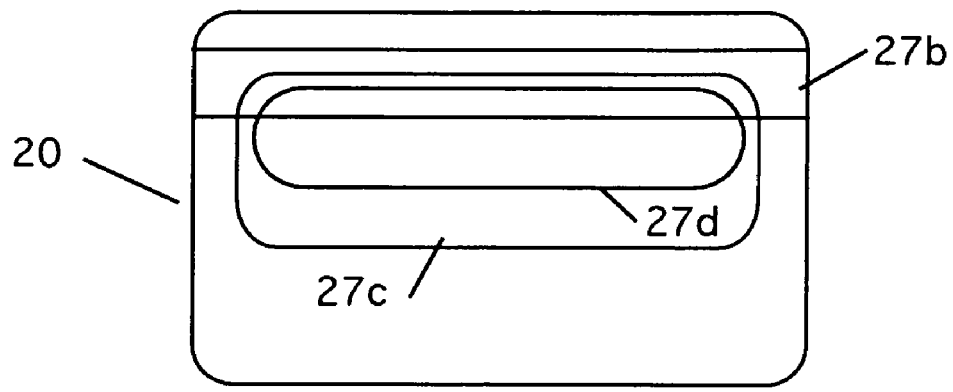
Figure 8C:
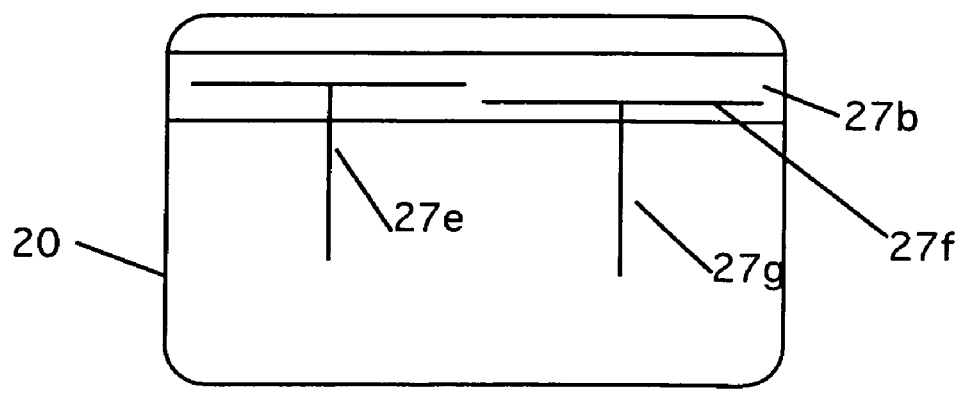

As noted above, the simulated cards above have been shown with coil and core shown as straight length magnetic stripes. However, it is possible to use coils and cores in different configurations rather than straight lengths. FIGS. 8a-8c are diagrammatic views of different configurations of loops formed on the card to store bits of data. FIG. 8a shows that the shape of the magnetic strip may be altered to form a loop. This helps contain the magnetic flux within the loop as opposed to a magnetic strip whose flux is concentrated on the ends like in a solenoid. In FIG. 8a, the card 20 is shown with a loop 27a. Note the location of the normal strip is shown as 27b.

FIG. 8b is an embodiment that has two coils 27c and 27d that are not overlapping. This is done to control the thickness of the card.

FIG. 8c has an inverted 'T' shaped coil and core 27e. The coil is wound on the stem 27g and the strip portion is overlapped on top. This makes wrapping the coil easier for construction and the fact of two pieces overlapping creates a gap which increases the flux leakage in the strip portion 27f for better induction coupling with the magnetic read head.

Note, the same loop configurations can be used on any of the simulation cards, 20, 30, or 40.

Figure 9:
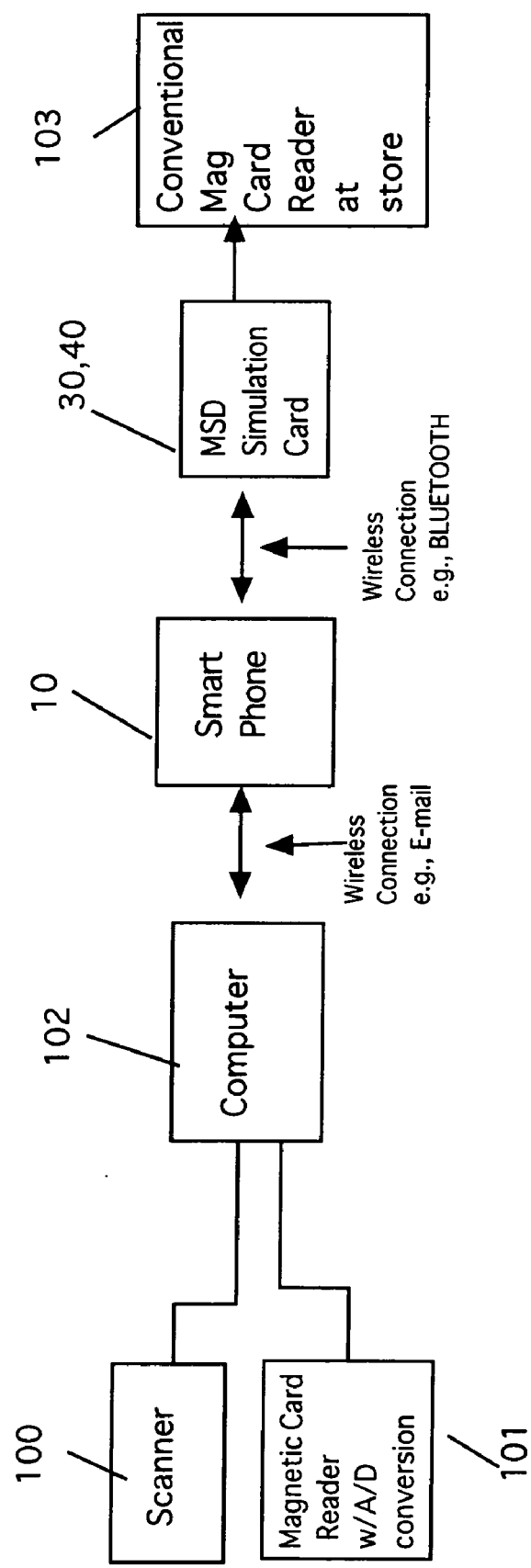
FIG. 9 is a block diagram of the system showing the steps for wireless communication, which is an alternative data entry method.

FIG. 9 is a block diagram of a wireless system. Here, all of the major components are shown and the steps involved in their use. In this embodiment, an optical scanner 100, and a custom magnetic card reader 101 that has an A/D converter, are shown attached to a computer 102. The A/D conversion may also be done in the computer instead of in the card reader. The computer has an application installed that stores the digital signal from the mag card reader 101 and also stores the scanned images of the front and back of a particular card. The collected data is then transferred to a cell phone 10 using a wireless connection as shown. Once stored, the system is ready to use. A user simply carries the cell phone 10 and the simulation card (either card 30 or 40). When the user desires to make a purchase, the user takes the simulation card out. The user selects the desired card file stored on the cell phone 10. The image of the card appears on the phone. The user shows this to the clerk if requested and places (swipes) the card. After the phone receives a triggering signal that the magnetic card reader 103 has the card in position to be read (or in one embodiment, the user activates the signal manually), the phone then sends the signal to the simulation card, where it is read by the reader. In the case of card 40, after showing the images of the card to the clerk or waitperson, the user can transmit the signal to the card, after which it is taken by the clerk to a remote terminal, where it is swiped and read as any other card. The user than completes the transaction in the normal manner.

Figure 9A:
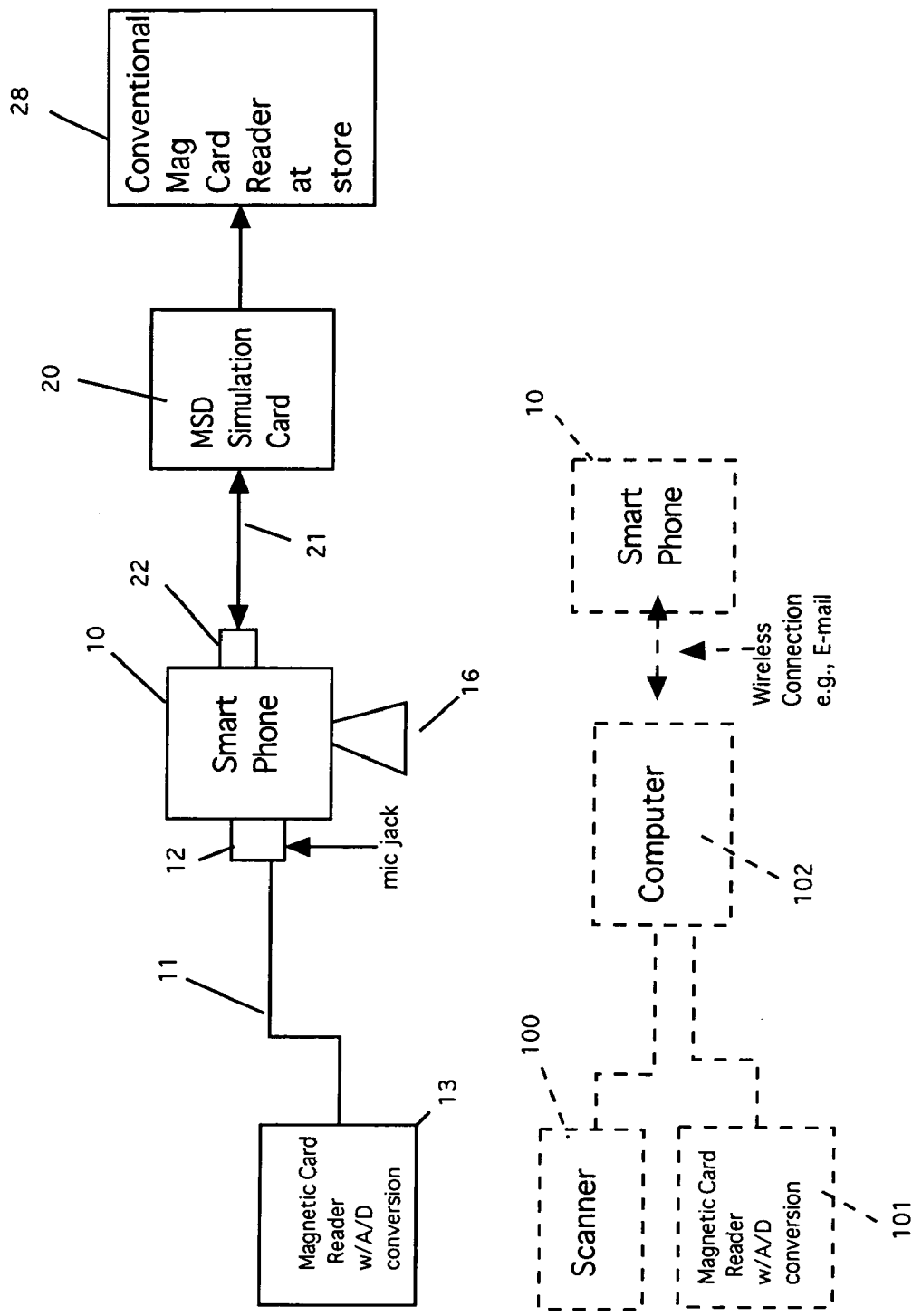
FIG. 9a is a block diagram of the system showing the method used in a tethered configuration.

FIG. 9a is a block diagram of a system using the method, with the card reader using the tethered system of FIG. 5, in which an embodiment was shown that used a tether to attach a cell phone directly to a card reader. As discussed above, a cell phone 10 that has a connection lead 11 that attaches to the microphone (MIC) jack 12. The other end of the lead 11 connects to a magnetic card reader 13. The user selects which cards the user wants to store in the cell phone. The cell phone has an application stored on it that reads the output from the magnetic card reader 13 and stores it for later use. The user also uses the camera 16 on the phone 10 to photograph the front and back of the card. The application then matches these photos up with the data for the card and stores it. Note, the dashed lines show a system that uses a computer, as discussed below, to read and store the data in a computer before sending it to the phone. This is an alternative data entry method. When the user is ready to use the card, the on-board application provides a list of stored cards. Once a card is selected, it is displayed on the cell phone and the data is ready to be sent to the simulation card, which is then swiped through the reader as discussed above.

Figure 9B:
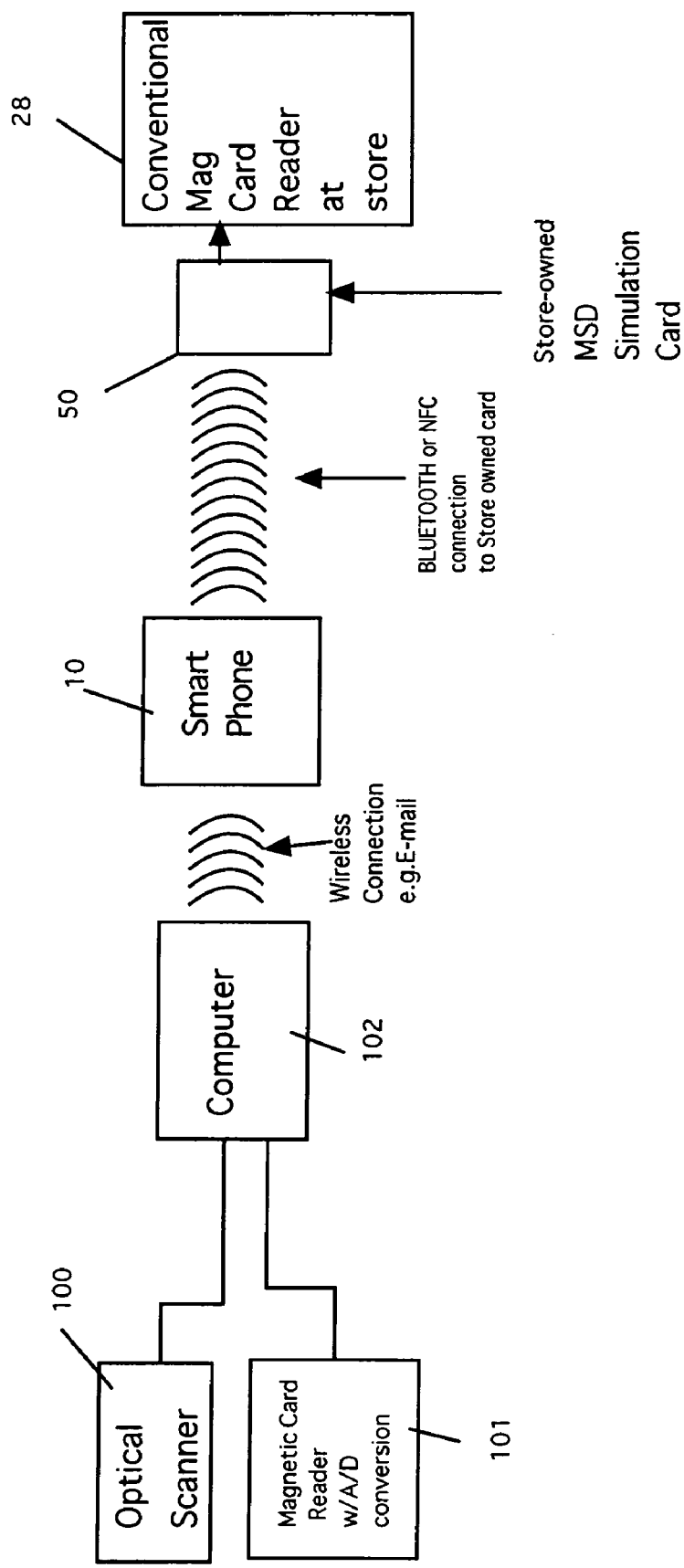
FIG. 9b is a block diagram of the system showing the method for use with an in-store card and data being transmitted by BLUETOOTH, NFC or similar wireless method.

As an alternative, the same method show in FIG. 9, including a scanner 100, a custom magnetic card reader 101 that has an A/D converter, and a computer 102, can be used to collect the data. This method is shown in dashed lines in FIG. 9a FIG. 9b is another embodiment, the method is modified slightly for NFC technology for POS (point of sale) operators who do not wish to add or change their equipment to handle NFC. As before, the individual card data is scanned/read either into a computer using the scanner 100, custom magnetic card reader 101 and computer 102. Alternatively, the data can be read directly into the phone (see FIG. 9a). This embodiment is similar to the BLUETOOTH version. The cell phone application sends the data to the simulator card using NFC technology. The simulator card microprocessor has an interposing application that simulates an NFC transaction response back to the cell phone and converts the data in the transaction to MSD data, which is present to the merchants POS reader. The consumer simply places his or her cell phone near the reader to send the signal to the card; it is then read by the card reader in the normal manner. In this embodiment, the application converts the NFC transaction data into MSD data allowing the transaction to be completed in the conventional magnetic strip method. The way file is constructed corresponding to the required MSD data. In this way, POS operators need not upgrade their equipment to offer NFC type transactions.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method for using a magnetic stripe data (MSD) simulator card using a system having a storage device with a means for inputting data received from a magnetic card reader, a means for outputting an analog signal therefrom, and a means for recording images thereon; an MSD simulator card having a means for temporarily receiving an analog thereon, and a means for converting said analog signal into a series of magnetic pulses; and a means for transferring said analog signal from said storage device to said simulator card comprising the steps of:

a) swiping a magnetic card, having a front face and a back face, containing data through a magnetic card reader;

b) moving said data from said magnetic card reader to said storage device;

c) taking photographs of the front and back faces of said magnetic card;

d) storing said photographs of the front and back faces of said magnetic card in said storage device;

e) transferring said data from said storage device to said MSD simulator card;

f) showing a store clerk the photographs of the magnetic card on a screen on said storage device; and g) swiping said MSD simulator card in a magnetic card reader.

2. The method of claim 1 wherein the steps of swiping the magnetic card and swiping said MSD card comprise pulling the card through a card reader.

3. The method of claim 1 wherein the steps of swiping the magnetic card and swiping said MSD card comprise placing the card in a card reader briefly.

4. The method of claim 1 wherein the steps of swiping the magnetic card and swiping said MSD card comprise allowing said card be swallowed and read by a motorized card reader.

5. The method of claim 1 wherein the storage device is a cellular phone.

6. The method of claim 1 wherein the means for inputting data comprises a microphone jack installed on said storage device.

7. The method of claim 1 wherein the means for outputting an analog signal therefrom comprise an earphone jack installed on said storage device.

8. The method of claim 1 wherein the means for recording images thereon comprises a camera installed in said storage device.

9. The method of claim 1 further comprising a program, installed in said storage device for assembling and managing the data inputted into said storage device.

10. The method of claim 1 wherein the temporarily receiving an analog signal thereon comprises a wire tether connected to said storage device and said simulator card.

11. The method of claim 1 wherein the means for temporarily receiving an analog signal thereon comprises a wireless connection between said storage device and said simulator card.

12. The method of claim 1 wherein the means for converting said analog signal into a series of magnetic pulses comprises at least one coil, formed on said MSD simulator card.

13. The method of claim 1 wherein the step of transferring said data from said storage device to said MSD simulator card further comprises the steps of:
  a) attaching a wire tether to said storage device and said MSD simulator card; and
  b) transferring said data from said storage device to said MSD simulator card via said wire tether.

14. The method of claim 1 wherein said storage device further comprises a wireless communication device installed therein.

15. The method of claim 14 wherein the step of transferring said data from said storage device to said MSD simulator card further comprises the steps of:
  a) activating wireless communication device within said storage device;
  b) establishing a wireless connection between said storage device and said MSD simulator card; and
  c) transferring said data from said storage device to said MSD simulator card via said wireless connection.

* * * * *